Figure 1:
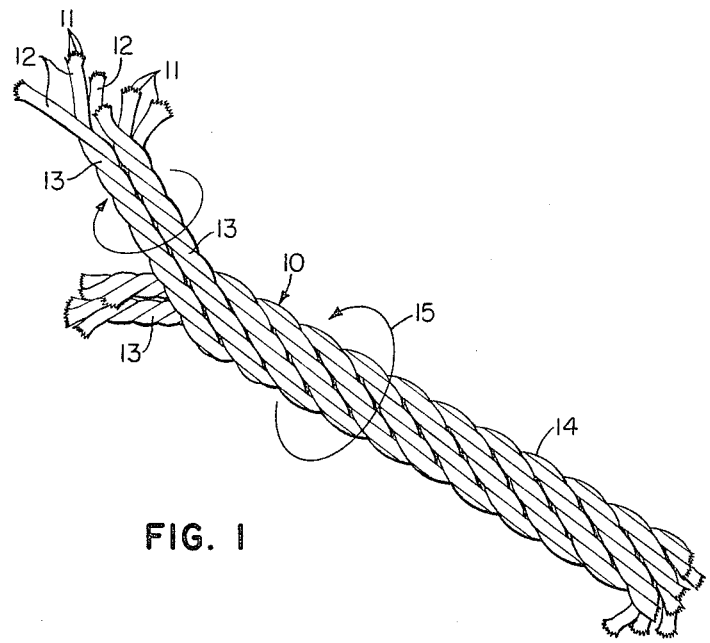

Aug. 6, 1968     D. D. RAY     3,395,529

REINFORCEMENT CORD AND METHOD OF MAKING SAME

Filed April 1, 1964

INVENTOR.
DANIEL D. RAY

BY

J.B. Holden
ATTORNEY

United States Patent Office 3,395,529
Patented Aug. 6, 1968

3,395,529
REINFORCEMENT CORD AND METHOD
OF MAKING SAME
Daniel D. Ray, Kent, Ohio, assignor to The Goodyear Tire & Rubber Company, Akron, Ohio, a corporation of Ohio
Filed Apr. 1, 1964, Ser. No. 356,620
13 Claims. (Cl. 57—153)

This invention relates to an improvement in an elastomeric reinforcement cord made from glass filaments, and, in particular, relates to the process of tensioning glass filament cords subsequent to the application of an adhesive.

It is common practice to reinforce elastomeric articles such as tires, V-belts, conveyor belts and wearing apparel with fiber cords strategically positioned so as to assume the loads encountered during the use thereof. The reinforcement material employed is usually in the form of a fabric or individual cords oriented so that they are generally parallel to the direction of the tensile forces applied to the elastomeric article. The above arrangement prevents excessive elongation in an axial direction, yet permits flexing to occur normal thereto.

A very versatile reinforcement material has been manufactured from staple fibers such as cotton. The cotton was treated with an adhesive then subjected to post-treatment in order to compensate for shrinking caused by solutions employed in the adhesive bath.

When certain elastomeric articles such as drive-belts, breakers and plies for tires are manufactured, the reinforcement material employed therein must provide adequate tensile strength and also must maintain a rigorous dimensional stability throughout the service life of the product. The reinforcement materials such as cotton and nylon provide adequate strength; however they do not maintain the overall dimensions of the elastomer in which they are embedded in a satisfactory manner.

In place of the organic reinforcement materials heretofore mentioned it has been found desirable to employ glass reinforcement in the form of continuous filaments. The glass filaments not only supply ample strength but they also maintain the overall dimensions of an article such as a drive-belt. In addition to the dimensional stability offered by the glass filament reinforcement, it is not seriously affected dimensionally by treatment with adhesives. The adhesive dipping process, which in some instances causes shrinkage in organic reinforcements, is necessary so that a chemical union can be made between the glass surface and the elastomeric body into which the reinforcement cords are encapsulated.

It has been discovered that glass filaments can be improved as a reinforcement media if all of the individual filaments are aligned in spaced relationship to one another to produce a more efficient lay. The ideal glass reinforcement yarn is one in which all the filaments are everywhere parallel to each adjacent filament and with each filament completely encased with a coating to prevent abrasion therebetween. Since it is difficult to work with reinforcement materials wherein all the filaments are everywhere parallel, a slight twist is imparted to the structure in order to discourage snarls and hold it in form for convenient handling. The slight twist incorporated in the reinforcement structure also is important to its overall strength characteristics. The glass filaments are further subjected to disalignment when they are dipped in an adhesive. After the glass filaments have been subjected to an adhesive dip, they are then tensioned while under the influence of heat to realign the filaments so that they are associated with one another in a more efficient lay.

It is therefore the primary purpose of this invention to provide an improved method of treating a glass filament reinforcement cord so as to improve its physical characteristics.

Another object of this invention is to obtain increased tensile values in a glass filament reinforcement cord by subjecting the cord to a predetermined tension and temperature subsequent to the application of an adhesive.

An additional object of the present invention is to properly align the individual glass filaments in a reinforcement cord that has been treated with a resorcinol-formaldehyde-latex adhesive coating.

Figure 2:
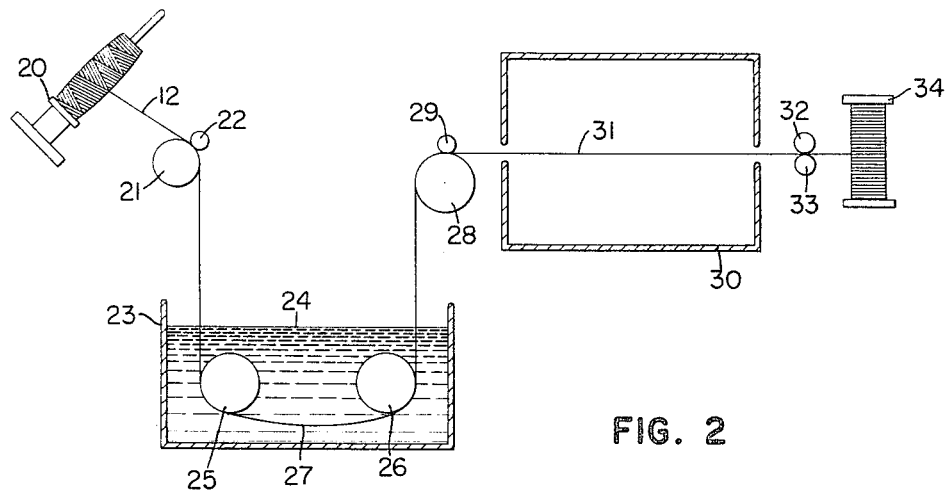

The invention may be more fully understood from the following description when taken in conjunction with an accompanying drawing in which:

FIGURE 1 of the drawing shows an elevational view of a portion of glass filament reinforcement cord of balanced construction. FIGURE 2 is a schematic side view of the cord treatment apparatus employed in the present invention.

In FIGURE 1 a typical glass filament reinforcement cord is shown at 10. Individual glass filaments 11 which are usually less than one-half of a thousandth of an inch in diameter are collected into yarns 12. While ideally yarns 12 would have no twist imparted thereto, it is common commercial practice to twist the yarns in the range of up to 1 turn per inch. Yarns 12 are twisted with an S twist into strands 13 which are in turn combined into a single balanced cord 14. The final twist employed in forming balanced cord 14 is in the Z direction as depicted by arrow 15 of FIGURE 1. Of course, it is obvious that the balanced cord could be constructed by first twisting the strands in the Z direction and the cord in the S direction. Since theoretically a glass fiber cord would exhibit its maximum strength when all individual filaments are in parallel orientation, it is desirable to keep the S and Z twists in balanced relationship. Because of the high torsional modulus of the glass filaments and the frictional forces generated between individual glass members it is desirable to keep the level of twist to a minimum. The amount of twist as shown in FIGURE 1 is merely representative of a typical cord construction and is not intended to imply that the material employed in this invention is so limited in twist.

FIGURE 2 shows a simplified version of the treatment apparatus employed in the present invention. The untreated low twist glass yarn 12 is shown on spool 20. Yarn 12 is unwound from spool 20 and is then passed over roll 21 and nip roll 22. The combined action of rolls 21 and 22 direct yarns 12 from roll 20 as it advances toward treatment tank 23 and at the same time provides the proper amount of slack required for processing yarn 12 through tank 23. Rolls 21 and 22 are only one of several ways wherein yarn 12 can be directed into tank 23. Tank 23 contains a resorcinol-formaldehyde-latex (RFL) solution 24 that adequately covers rolls 25 and 26. Yarn 12 is directed from rolls 21, 22 under roll 25 and hence to roll 26. As yarn 12 spans the unsupported distance between rolls 25 and 26 it is desirable to provide for a slack area in yarn 12. Yarn 12 passes from tank 23 and is trained over roll 28 which acts in conjunction with nip roll 29. Heat treatment unit 30 is positioned so as to receive yarn 12 as it travels from rolls 28 and 29. Within unit 30 yarn 12 undergoes thermal treatment and at the same time a predetermined tension is applied to orient the individual fibers of yarn 12 so that they are as near as possible parallel to each other. As yarn 12 exits from unit 30 it passes between nip rolls 32 and 33 which train it on wind-up spool 34. The yarn 12 can be trained through dip tank 23 by the tension created by rolls 28 and 29, or by rolls 32 and 33, or by both sets of rolls. While yarn 12 is in heat unit 30 it is thoroughly dried and is then wound on spool 34. As has been pointed out before, rolls 21 and 22 do not push the material through the dip tank 23, but merely move the yarn 12 from spool 20 in an even manner thus avoiding undue tension in tank 23 when and if the yarn begins to snag on spool 20. In similar fashion rolls 21 and 22 prevent an excess of material from entering dip tank 23.

In the foregoing description the yarn 12 is subjected to an RFL dip of which the following formulation is typical.

Pliolite VP100 (vinylpyridine-butadiene-styrene terpolymer latex) 40% solids _____ 50
Pliolite 2108 (butadiene-styrene copolymer) 40% solids _____ 200
Resorcinol-formaldehyde resin solution _____ 346

596

Resorcinol-formaldehyde solution:
  Resorcinol _____ 11.6
  Formaldehyde (37%) _____ 12.8
  Sodium hydroxide (10%) _____ 10.0
  Water _____ 311.6

346.0

It is understood that the solutions set forth above may vary without departing from the scope of the invention.

After the yarn 12 has passed through the RFL dip solution 24 where the individual filaments have been encapsulated because of the relaxed or sperad apart condition of the yarn, it passes through the heat unit 30 and hence to wind-up spool 34. Several of the RFL treated yarns containing a very low twist are then twisted, lay twisted, or stranded together to form a strand such as 13. A plurality of strands are then combined into a cord to produce a balanced load carrying tensile reinforcement member as heretofore described.

The completed cord 14 having all filaments therein encapsulated with a RFL adhesive solution, is then passed through the treatment assembly shown in FIGURE 2 similar to the manner in which individual yarn 12 was processed. For this treatment dip tank 23 can be empty, or can contain water, or the regular RFL adhesive solution. The slack, or relaved section 27 between rolls 25 and 26 is not necessary since the individual glass filaments have previously been coated. The cord 14 may, if desired at this time, be given an additional coat of RFL adhesive.

In heat treatment unit 30 cord 14 is ideally subjected to a tension in the range of 0.03 to 0.5 gram per denier. However, it would be readily apparent to those skilled in the art that the tension could be varied greatly and that the glass is capable of withstanding increased loads because of its superior tensile strength. The heat bath provided by unit 30 softens the adhesive film deposited on cord 14 and the simultaneous application of tension permits the individual filaments 11 that comprise cord 14 to become oriented in a more efficient lay. The temperature within the heat unit 30 was ideally set at 300° F. and the overall time for retention of the cord within unit 30 was in the range of 6–8 minutes. The above temperature-time relationship is by way of example since it would be apparent that a much lower temperature would ultimately soften the adhesive, but a longer retention time would be required. Also, the cord could be subjected to a high temperature for a short time interval.

It has been found that a significant increase in strength can be attained in cord 14 by subjecting it to the above set forth method. The following example is representative of the increased strength noted:

TESTS ON DIPPED GLASS FILAMENT CORD

| Test | Adhesion, lb./in. | Strength, lbs. |
| --- | --- | --- |
| (1) Yarns dipped and twisted into a cord_____ | 88 | 135 |
| (2) Cord heat treated and tensioned after passing through dip tank containing air. | 86 | 149 |
| (3) Cord heat treated and tensioned after passing through dip tank containing water. | 96 | 147 |
| (4) Cord heat treated and tensioned after passing through dip tank containing RFL_____ | 122 | 144 |

Test 1 shows the results of a cord formed from yarns that were encapsulated by dipping in a RFL solution then twisted into a balanced cord. The cord was not passed through an additional adhesive bath, nor was the cord heated and tensioned. A subsequent tensile test showed that an ultimate load of 135 pounds was attained.

Test 2 utilized a cord of similar construction as that employed in Test 1. The cord was passed through the apparatus on FIGURE 1. An adhesive solution was omitted from dip tank 23. The cord was, however, thermally conditioned in heat unit 30 and at the same time subjected to a tensile load. A significant improvement in the ultimate tensile load was noted.

Test 3 was similar to Test 2 except that the cord was passed through a dip tank containing water. The resulting tensile value was again high and the adhesion was somewhat improved.

Test 4 was similar to Test 3 except that a RFL bath was utilized, both tensile and adhesion were high.

The above described strength tests were standard tests performed on an Instron constant rate of extension tester operated at a rate of about 10 inches per minute. The adhesion tests were H-block tests performed similar to the test procedure outlined in A.S.T.M. (American Society for Testing and Materials) D2138 Standards on Rubber Materials, Committee D–11.

While certain representative embodiments and details have been shown for the purpose of illustrating the invention, it will be apparent to those skilled in this art that various changes and modifications may be made therein without departing from the spirit or scope of the invention.

What is claimed is:

1. The method of making a glass filament cord for reinforcement in an elastomeric article comprising the steps of: forming a reinforcement member of a multiplicity of glass filaments; applying an adhesive to the surfaces of all the filaments; equalizing all the filaments by subjecting the filaments to a predetermined tension while the adhesive is in soft condition and the filaments are mobile with respect to one another therein to properly align the filaments to provide a more efficient lay; and heating said member to dry the adhesive.

2. The method of claim 1 wherein the adhesive is of resorcinol-formaldehyde-latex formulation.

3. The method of making a glass filament reinforcement cord for an elastomeric article comprising: spreading apart the filaments of a yarn having a multiplicity of glass filaments; applying adhesive to encase individually substantially all of the filaments with an adhesive coating while they are in a spread apart condition; said spreading and said applying subjecting the filaments to disalignment; subjecting the so-coated filaments to tension while the adhesive thereon is under the influence of heat and softened so that the filaments are realigned and associated with one another in a more efficient lay to increase the ultimate strength of the cord; and plying together a plurality of said yarns to form said reinforcement cord.

4. The method of claim 3 wherein the adhesive is of resorcinol-formaldehyde-latex formulation.

5. The method of making a reinforcement member for an elastomeric article comprising the steps of: (1) passing a low twist yarn containing a plurality of individual filaments into contact with an adhesive, (2) relaxing the yarn while in contact with said adhesive so that the individual filaments spread apart, (3) encapsulating the surface of each of the filaments with a coating of adhesive, (4) drying the adhesive coated yarn subsequent to said adhesive application, (5) forming a pluality of adhesive coated yarns into a low twist strand, (6) combining a plurality of strands into a balanced reinforcement cord, (7) heating said cord and the adhesive contiguous therewith to at least 200° F. by means of a heat chamber, and (8) subjecting the heated adhesive coated reinforcement cord to a predetermined tension force of at least 0.03 gram per denier so that the individual filaments are arranged in a more efficient lay thus increasing the ultimate strength of said cord.

6. The method of claim 5 wherein the adhesive is of resorcinol-formaldehyde-latex formulation.

7. In a process of making glass fiber reinforcement member for an elastomeric article including the steps of plying or twisting fiber filaments into yarn and yarns into cord, and of treating the surface of such yarn and cord with adhesive, the improvement comprising: relaxing a low twist yarn to a substantially, untensioned state to allow opening of said yarn and loosening of the fiber filaments thereof; applying to the surfaces of individual fiber filaments while said yarn is in said state an adhesive coating of resorcinol-formaldehyde-latex; tensioning the so coated yarn while heating said yarn and while said adhesive is softened and plastic to realign and reorient filaments thereof; then plying a plurality of said coated yarns with only slight twist to form a cord of balanced twist.

8. In a process according to claim 7 the further improvement comprising stretching while heating said cord and softening said adhesive.

9. In a process according to claim 7 the further improvement comprising applying to said cord an additonal coating of R.F.L. and then heating while stretching said cord.

10. A reinforcement cord made in accordance with the method of claim 5.

11. A reinforcement cord made in accordance with the method of claim 7.

12. A reinforcement cord made in accordance with the method of claim 1.

13. A reinforcement cord made in accordance with the method of claim 3.

References Cited

UNITED STATES PATENTS

| | | | |
|---|---|---|---|
| 2,220,958 | 11/1940 | Jennings | 57—153 X |
| 2,224,274 | 12/1940 | Powers | 57—153 |
| 2,631,463 | 3/1953 | Waugh | 57—140 |
| 2,691,614 | 10/1954 | Wilson | 57—153 |
| 2,842,932 | 7/1958 | Owens | 57—35 |

JOHN PETRAKES, *Primary Examiner.*